United States Patent [19]

Sjursen

[11] Patent Number: 5,978,126
[45] Date of Patent: Nov. 2, 1999

[54] APPARATUS FOR CONTROLLING AN ELECTROCHROMIC DEVICE

[75] Inventor: Walter P. Sjursen, Washington Crossing, Pa.

[73] Assignee: PPG Industries Ohio, Inc., Cleveland, Ohio

[21] Appl. No.: 09/157,724

[22] Filed: Sep. 21, 1998

[51] Int. Cl.[6] .................................................. G02F 1/163
[52] U.S. Cl. ............................ 359/265; 359/275; 351/44
[58] Field of Search .................................... 359/265, 267, 359/275; 351/44, 45; 345/105

[56] References Cited

U.S. PATENT DOCUMENTS

| | | | |
|---|---|---|---|
| 3,630,603 | 12/1971 | Letter | 351/44 |
| 3,972,040 | 7/1976 | Hilsum et al. | 340/324 M |
| 4,210,907 | 7/1980 | Hamada et al. | 340/785 |
| 4,219,809 | 8/1980 | Schwarzschild et al. | 340/785 |
| 4,298,870 | 11/1981 | Saegusa | 340/785 |
| 4,512,637 | 4/1985 | Ballmer | 350/357 |
| 4,529,275 | 7/1985 | Ballmer | 350/357 |
| 4,832,468 | 5/1989 | Ito et al. | 350/357 |
| 4,892,394 | 1/1990 | Bidabad | 350/357 |
| 5,365,365 | 11/1994 | Ripoche et al. | 359/267 |
| 5,402,144 | 3/1995 | Ripoche | 345/105 |
| 5,455,637 | 10/1995 | Kallman et al. | 351/44 |
| 5,455,638 | 10/1995 | Kallman et al. | 351/44 |
| 5,471,338 | 11/1995 | Yu et al. | 359/273 |
| 5,486,952 | 1/1996 | Nagao et al. | 359/603 |
| 5,552,841 | 9/1996 | Gallorini et al. | 351/49 |
| 5,581,406 | 12/1996 | Kobayashi et al. | 359/604 |
| 5,587,828 | 12/1996 | Bernard, Jr. | 359/275 |
| 5,604,626 | 2/1997 | Teowee et al. | 359/265 |
| 5,608,567 | 3/1997 | Grupp | 359/275 |
| 5,671,035 | 9/1997 | Barnes | 351/45 |

FOREIGN PATENT DOCUMENTS

WO 97/28484  8/1997  WIPO.

OTHER PUBLICATIONS

Copending U.S. application Ser. No. 09/157,723 entitled "Method and Apparatus for Controlling an Electrochromic Device", filed Sep. 21, 1998, by Walter P. Sjursen, et al.
U.S. Pat. application Ser. No. 09/157,725 entitled "Method and Apparatus for Controlling an Electrochromic Device", filed Sep. 21, 1998, by Timothy A. Pletcher, et al.
U.S. Pat. application Ser. No. 09/046,386 entitled "Method for Forming a Molded Edge Seal", filed Mar. 23, 1998, by John E. Smarto, et al.

*Primary Examiner*—Georgia Epps
*Assistant Examiner*—Margaret Burke
*Attorney, Agent, or Firm*—William C. Mitchell

[57] ABSTRACT

An apparatus for controlling a charge state of an electrochromic devices according to the invention, where the electrochromic devices receives a charging current, comprises: a reference impedance, coupled to receive a reference current proportional to the charging current, the reference impedance having a known impedance relationship with the electrochromic device; a comparator, coupled to the reference impedance, for comparing a voltage level of the reference impedance to a threshold voltage level and producing an output signal indicative of the comparison; and control logic, coupled to the comparator, for simultaneously adapting the reference current and the charging current in response to the output signal of the comparator. In one embodiment of the invention, the apparatus is included within a pair of eyeglasses.

18 Claims, 3 Drawing Sheets

APPARATUS FOR CONTROLLING AN ELECTROCHROMIC DEVICE

This application is related to U.S. patent application Ser. No. 09/157,723, filed on the same date as the present application.

The invention relates to the control of electrochromic devices, more particularly, the invention relates to a control apparatus suitable for use in an electrochromic device control system.

BACKGROUND OF THE DISCLOSURE

The optical transmission characteristics of an electrochromic (EC) device are controlled by the amount of charge imparted to the device. Specifically, increasing the amount of charge in an electrochromic device results in a "darkening" or "coloring" of the device, while decreasing the amount of charge in an electrochromic device results in a "lightening" or "bleaching" of the device. Since an electrochromic device may be modeled as a non-linear passive device having an impedance dominated by a capacitive component, the amount of charge imparted to an electrochromic device is typically controlled by utilizing current sources and current sinks.

Electrochromic control arrangements utilizes circuit components having characteristics that tend to drift over time and temperature, thereby imparting more or less charge to the EC device than is otherwise desired. To ensure that an appropriate charge level is imparted to an electrochromic device, some electrochromic control arrangements electrically or optically measure the device directly to determine the present charge level and, if necessary, adjust that charge level. Such measurement is necessary because of the inability to predict with a sufficient degree of certainty the degradation of components within a particular system.

It is seen to be desirable to provide an electrochromic control apparatus that corrects for system and device errors within an electrochromic control system without directly measuring the electrochromic device. Moreover, it is seen to be desirable to provide such electrochromic control apparatus in an energy efficient manner.

SUMMARY OF THE INVENTION

The invention comprises an apparatus for controlling a charge level of an electrochromic device. Specifically, an apparatus for controlling a charge state of an electrochromic device according to the invention, where the electrochromic device receives a charging current, comprises: a reference impedance, coupled to receive a reference current proportional to the charging current, the reference impedance having a known impedance relationship with the electrochromic device; a comparator, coupled to the reference impedance, for comparing a voltage level of the reference impedance to a threshold voltage level and producing an output signal indicative of the comparison; and control logic, coupled to the comparator, for simultaneously adapting the reference current and the charging current in response to the output signal of the comparator.

In one embodiment of the invention, the apparatus is included within a pair of eyeglasses.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
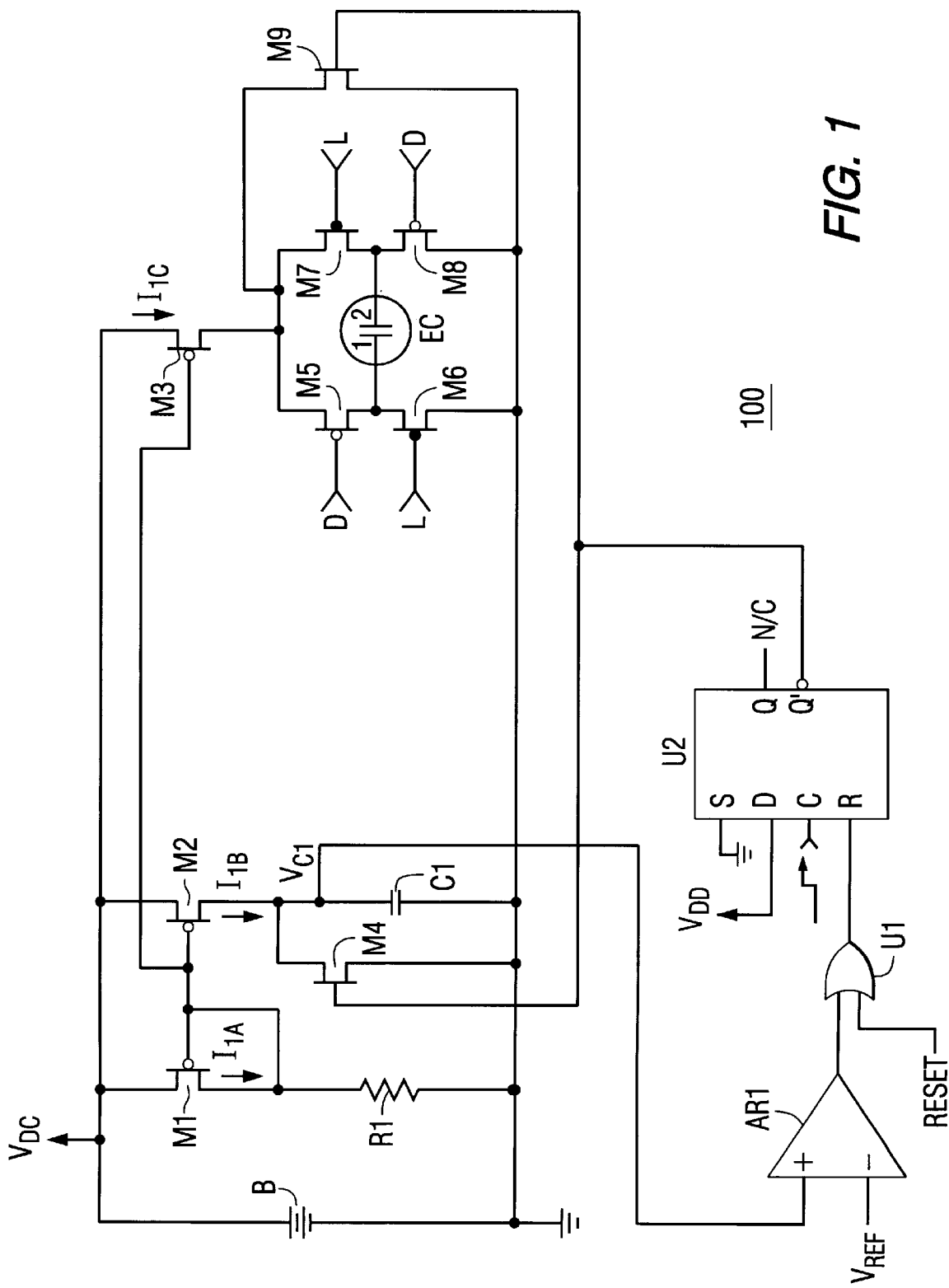
FIG. 1 depicts a schematic diagram of an electrochromic control apparatus according to the invention.

FIG. 1 depicts a schematic diagram of an electrochromic control apparatus 100 according to the invention. Specifically, the control apparatus 100 comprises a battery B, a resistor R1, a capacitor C1, nine transistors M1–M9, a comparator AR1, an OR gate U1, a D-type flip-flop U2 and an electrochromic device EC to be controlled.

A first current loop is formed by the battery B, the first transistor M1 and the resistor R1. Specifically, an input terminal of first transistor M1 is coupled to the positive terminal of battery B. Resistor R1 is coupled between an output terminal of first transistor M1 and the negative terminal of battery B. A control terminal of first transistor M1 is coupled directly to the output terminal of transistor M1. Additionally, the control terminal of first transistor M1 is coupled to a control terminal of second transistor M2 and a control terminal of third transistor M3.

A second current loop is formed by the battery B, the second transistor M2 and either the capacitor C1 or the fourth transistor M4. Specifically, an input terminal of second transistor M2 is coupled to the positive terminal of the battery B. Capacitor C1 is coupled between an output terminal of second transistor M2 and the negative terminal of the battery B. An input of fourth transistor M4 is coupled to the junction of second transistor M2 and capacitor C1. An output terminal of fourth transistor M4 is coupled to the negative terminal of the battery B. A control terminal of the fourth transistor M4 is coupled to an inverting data output Q' of the D-type flip-flop U2.

A third current loop is formed by the battery B, the third transistor M3 and one of either the electrochromic device EC in series with the fifth M5 and eighth M8 transistors, the electrochromic device EC in series with the seventh M7 and Sixth M6 transistors, or the ninth transistor M9. Specifically, an input terminal of third transistor M3 is coupled to the positive terminal battery B. An output terminal of third transistor M3 is coupled to an input terminal of fifth transistor M5 and an input terminal of transistor M7. An output terminal of fifth transistor M5 is connected to an input terminal of sixth transistor M6 and a first terminal of the electrochromic device EC. An output terminal of seventh transistor M7 is coupled to an input terminal of eighth transistor M8 and a second terminal of the electrochromic device EC. An output terminal of sixth transistor M6 and an output terminal of eighth transistor M8 is coupled to the negative terminal of the battery B. An input terminal of ninth transistor M9 is coupled to the junction of transistors M3, M5 and M7. An output terminal of the ninth transistor M9 is coupled to the negative terminal of the battery B. A control terminal of the ninth transistor M9 is coupled to the inverting data output Q' of the D-type flip-flop U2.

The control terminals of transistors M5 and M8 are coupled to a control signal D, while the control terminals of transistors M7 and M6 are coupled to a control signal L. The exemplary control signals D and L are active low signals produced by, e.g., a controller or respective switches (not shown). That is, to turn on transistors M5 and M8, control signal D goes to a logic low state. Similarly, to turn on transistors M7 and M6, control signal L goes to a logic low state. It should be noted that the transistor control terminals are depicted as logical input terminals to simplify the discussion. Since the invention does not require the use of a particular type of transistor, those skilled in the art will readily devise suitable control signal conditioning circuitry for the selected transistor type(s) to comport with the following discussion.

In the embodiment of FIG. 1, it is assumed that current entering the first terminal of the electrochromic device EC imparts a charge to the EC device (i.e., darkens or colors the EC device), while current exiting the first terminal of the electrochromic device EC removes charge from the EC device (i.e., lightens or bleaches the EC device). Thus, if ninth transistor M9 is off, a low level of the D control signal results in a charging (or darkening) of the EC device while a low level of the L control signal results in a discharging (or lightening) of the EC device. If the L and D control signals are simultaneously at a logic low level, then the electrochromic device EC will discharge.

A non-inverting input of comparator AR1 is coupled to the junction $V_{C1}$ of second transistor M2 and capacitor C1. An inverting input of comparator AR1 is coupled to a voltage reference VREF. An output terminal of comparator AR1 is coupled to an input terminal of OR gate U1. A positive reset signal produced by, e.g., a "power-on" reset circuit (not shown) is coupled to a second input of OR gate U1. Thus, the output terminal of OR gate U1 achieves a high logic state in response to the positive reset signal and in response to the capacitor voltage $V_{C1}$ exceeding the reference voltage $V_{REF}$.

The flip flop U2, illustratively a D-type flip-flop, operates in a known manner and comprises a clock input CLK, a data input D, a set input S, a reset input R, a non-inverted data output Q and an inverted data output Q'. Those skilled in the art will recognize that other types of sequential logic circuitry may be used to implement the functionality of the exemplary D-type flip-flop.

An output of OR gate U1 is coupled to the reset input R of D-type flip-flop U2. The data input D of D-type flip-flop U2 is coupled to the positive terminal of the battery B, while the set input S is coupled to ground. In the exemplary embodiment, the non-inverting data output terminal Q is not used.

The three above-described current loops operate in a current-mirror fashion. That is, the current through the first current loop $I_{1A}$ is substantially equal to the current through the second current loop $I_{1B}$ and the current through the third current loop $I_{1C}$. The value of the current $I_{1A}$ depends upon the value of resistor R1, the voltage of the battery B, and the gate-to-source voltage drop of transistor M1 (assuming a field effect transistor is used). The current $I_{1A}$ (and, therefore the value of currents $I_{1B}$ and $I_{1C}$) is calculated according to equation 1, as follows:

$$I_{1A} = \frac{V_{DD} - V_{gs}(M1)}{R1} \quad \text{(equation 1)}$$

The exemplary embodiment of FIG. 1 operates as a constant-charge driver to charge the capacitor C1 and the electrochromic device EC as follows. First, after receiving an initial positive reset pulse from, e.g., a power-on reset circuit, the inverting data output Q' goes to a high logic state, putting transistors M4 and M9 in an "on" or conducting state. Transistors M4 and M9 conduct, respectively, current $I^{1B}$ and $I_{1C}$, the capacitor C1 and the electrochromic device EC are bypassed, and any charge present on C1 is discharged. It should be noted that after reset condition, in which transistors M5 through M8 are turned to their "off" states, the EC will not be discharged.

Second, in response to a rising edge of the signal presented to the clock input C of the flip-flop U2, the inverting output Q' goes to a low logic state, putting transistors M4 and M9 in an "off" or non-conducting state. Capacitor C1 is linearly charged by current $I_{1B}$ while the electrochromic device EC is linearly charged by current $I_{1C}$. The capacitor C1 and electrochromic device EC continue to be charged until the voltage across the capacitor C1 (i.e., voltage $V_{C1}$) exceeds the reference voltage $V_{REF}$.

Third, in response to the capacitor voltage $V_{C1}$ exceeding the reference voltage $V_{REF}$, the output of voltage comparator AR1 goes to a logic high state. The OR gate U1 propagates the logic high level of the comparator output to the reset input R of the D-type flip-flop U2, resetting the flip-flop such that the inverting data output Q' goes to a logic high state, thereby turning on transistors M4 and M9 to complete a cycle.

The above-described cycle is associated with a period of time t, as indicated in Equation 2 (below). Specifically, the charge imparted to the electrochromic device EC (or capacitor C1, is proportional to the third current $I_{1C}$ (or second current $I_{1B}$) and the time t in which the current is applied to the device, the following equation may be used to determine the charge injected into the device during a fixed amount of time, where ?t represents the fixed amount of time, ?V represents the change in voltage during the fixed amount of time, C1 represents the capacity of capacitor C1, $I_{1B}$ represents the current passed through capacitor C1 during the fixed amount of time.

$$\Delta t = \Delta V \times \frac{C1}{I_{1B}} = VREF \times \frac{C1}{I_{1B}} \quad \text{(equation 2)}$$

Thus, it can be concluded that:

$$I_{1B} \times t = VREF \times C1 \quad \text{(equation 3)}$$

Equation 3 illustrates the direct, proportional effect of the capacitance of capacitor C1 on the cycle time of the control apparatus. Specifically, for a given loop current $I^{1A}$ and reference voltage $V_{REF}$, the timing step size (?t) of a charge or discharge cycle is determined by the capacitance of capacitor C1. The smaller the capacitor, the quicker the cycle time (i.e., the more rapid the change in the electrochromic device EC). It must be noted that Equation 2 assumes a constant value of $I_{1B}$. In the embodiment of FIG. 1, $I_{1B}$ will vary with the battery voltage. However, the total charge imparted to C1 will still be equal to C1×VREF.

Figure 2:
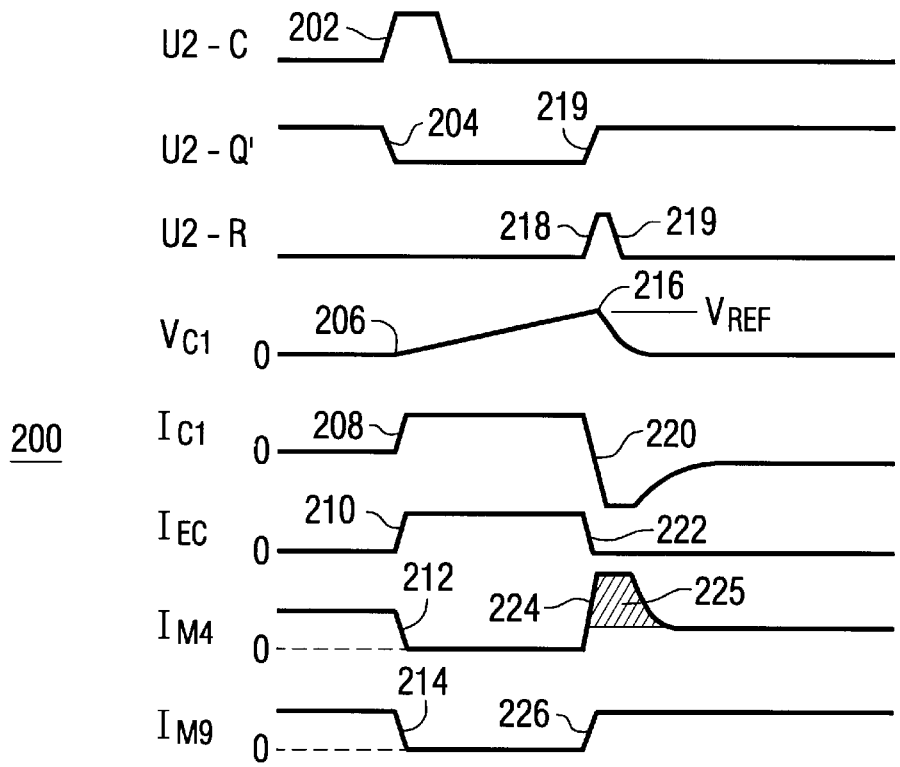
FIG. 2 depicts a timing diagram useful in understanding the operation of the electrochromic control apparatus of FIG. 1.

FIG. 2 depicts a timing diagram useful in understanding the operation of the electrochromic control circuit 100 of FIG. 1. Specifically, FIG. 2 comprises eight parameters associated with the electrochromic control circuit 100 of FIG. 1. The first row of FIG. 2, denoted as U2-C, depicts a clock signal applied to the clock input terminal C of the D-type flip-flop U2. The second row, denoted as U2-Q', depicts the signal output of the inverting data output Q' of the D-type flip-flop U2. The third row, denoted as U2-R, denotes the signal applied to the reset input R of the D-type flip-flop U2. The fourth row, denoted $V_{C1}$, depicts the voltage across capacitor C1. The fifth row, denoted $I_{C1}$, depicts the current through capacitor C1. The sixth row, denoted $I_{EC}$, depicts the current through the electrochromic device EC. The seventh row, denoted as $I_{M4}$, depicts the current through transistor M4. The final row, denoted $I_{M9}$, depicts the current through transistor M9.

In response to a rising edge on the clock input of D-type flip-flop U2 (202), the inverted data output Q' of the D-type flip-flop U2 goes to a low logic state (204). When Q' goes low, transistors M4 and M9 are turned off (212, 214), and the current through capacitor C1 (208) and the electrochromic device EC (210) increases to, respectively, $I_{1B}$ and $I_{1C}$. Coincident with the increase in current through capacitor C1 (208), the voltage across capacitor C1 (206) begins increasing in a linear fashion. When the voltage across capacitor C1 exceeds the reference voltage VREF (216), the output of comparator AR1 goes to a logic high state. The OR gate U1 propagates the logic high state of the comparator AR1 output to the reset input R of D-type flip-flop U2 (218). In response, the inverting data output Q' goes to a logic high state (219), thereby turning on fourth transistor M4 and ninth transistor M9 (224, 226). At this time, the current through fourth transistor M4 increases dramatically (225) as the stored charge of capacitor C1 is discharged through transistor M4 as a current in addition to the second loop current $I_{1B}$. As the capacitor C1 discharges the capacitor voltage $V_{C1}$ drops to a level below the reference voltage $V_{REF}$. In response, the output of comparator AR1 goes to a logic low state. The OR gate U1 propagates the logic low state of the comparator AR1 output to the reset input R of D-type flip-flop U2 (219).

The above-described charge cycle is initiated by a positive-going edge or logic high level of the clock signal applied to the clock input terminal C of the D-type flip-flop U2. The above-described charge cycle is terminated by the positive-going edge or logic high level of the signal applied to the reset input R of D-type flip-flop U2.

As previously noted, an electrochromic device may be modeled as a non-linear passive device having an impedance dominated by a capacitive component. Thus, since the capacitor C1 and the electrochromic device EC are charged at the same time (due to the synchronized operation of fourth transistor M4 and ninth transistor M9) using substantially the same amount of current (second current $I_{1B}$ and third current $I_{1C}$, respectively), the amount of charge imparted to capacitor C1 is proportional to the amount of charge imparted to the electrochromic device EC. The proportional relationship is defined by the relationship between the relative magnitudes of currents $I_{1B}$ and $I_{1C}$, which in turn are defined by the transconductance of transistors M2 and M3.

The charge imparted to capacitor C1 is dependent only on the reference voltage $V_{REF}$ and the value of C1. Tight tolerance (i.e., accurate) reference voltage sources are readily manufacturable using standard integrated circuit (IC) fabrication techniques. However, tight tolerance capacitors are not readily manufacturable using standard IC fabrication processes.

Figure 3:
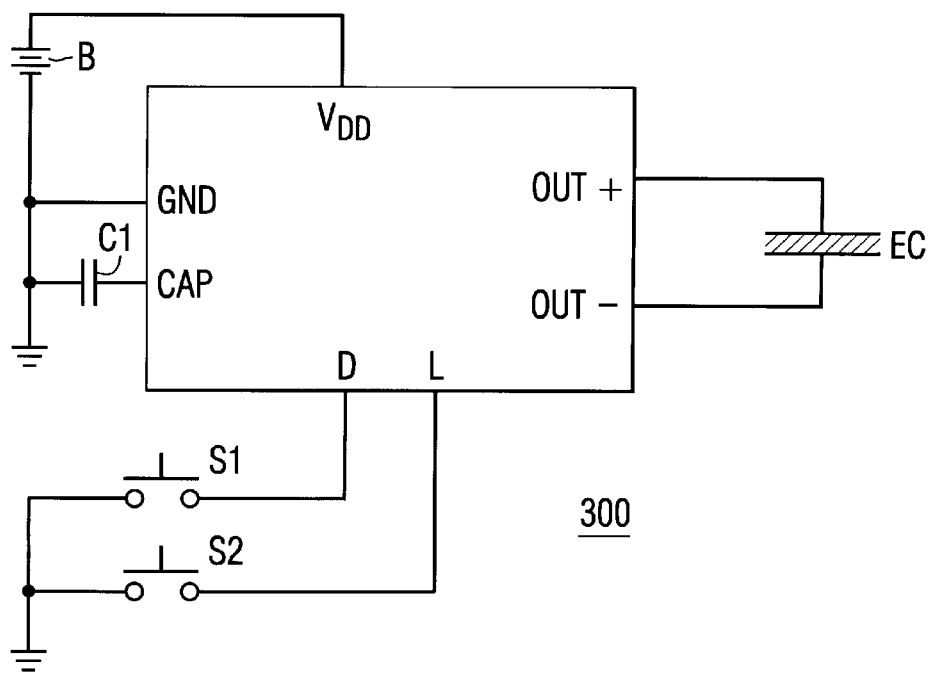
FIG. 3 depicts a single chip implementation of an electrochromic control apparatus according to the invention.

FIG. 3 depicts a single chip implementation of an electrochromic control apparatus according to the invention. Specifically, in the embodiment of FIG. 3, all of the circuitry depicted in FIG. 1 (except the capacitor C1, the battery B and the electrochromic device EC) is incorporated into a single integrated circuit (or chipset). In addition, a switch S1 is used to provide the darken signal D, while a switch S2 is used to provide the lighten signal S. The capacitor C1 is coupled to ground and to a terminal CAP. The terminal CAP is internally connected to the junction of second transistor M2 and fourth transistor M4.

The embodiment of FIG. 3 allows certain economies of scale to be brought to bear in terms of both cost and volumetric compaction such that the electrochromic control apparatus may be manufactured inexpensively and in a small form factor. In this embodiment, the capacitor C1 comprises an external capacitor having a tight tolerance, while the battery comprises a small volume battery. This embodiment is suitable for use in, e.g., consumer sunglass applications. In such applications, the electrochromic device EC is incorporated into (or disposed upon) the lens material used in the sunglasses; while the battery B, capacitor C1, control apparatus are incorporated into the body of the sunglasses. The control apparatus may be controlled using, e.g., "lighten" switch S2 and a "darken" switch S1.

Another method and apparatus suitable for controlling an electrochromic device EC is described in more detail in co-pending U.S. patent application Ser. No. 09/157,725 (Attorney Docket No. 96066) filed on the same day as the present application, and incorporated herein by reference in its entirety.

As previously discussed, the external capacitor C1 sets the amount of charge (i.e., step size) injected into the electrochromic device EC for each push of a switch. Switch debouncing would typically be included on the IC. No on-board memory is needed since the user can view the glasses to determine the state of transmissivity. The IC can be fabricated using low-power complementary metal oxide (CMOS) technology to keep battery drain low. To reduce power drain on the battery even further, the electrochromic control apparatus 100 of FIG. 1 may be modified in, e.g., the manner described below with respect to FIG. 4.

Figure 4:
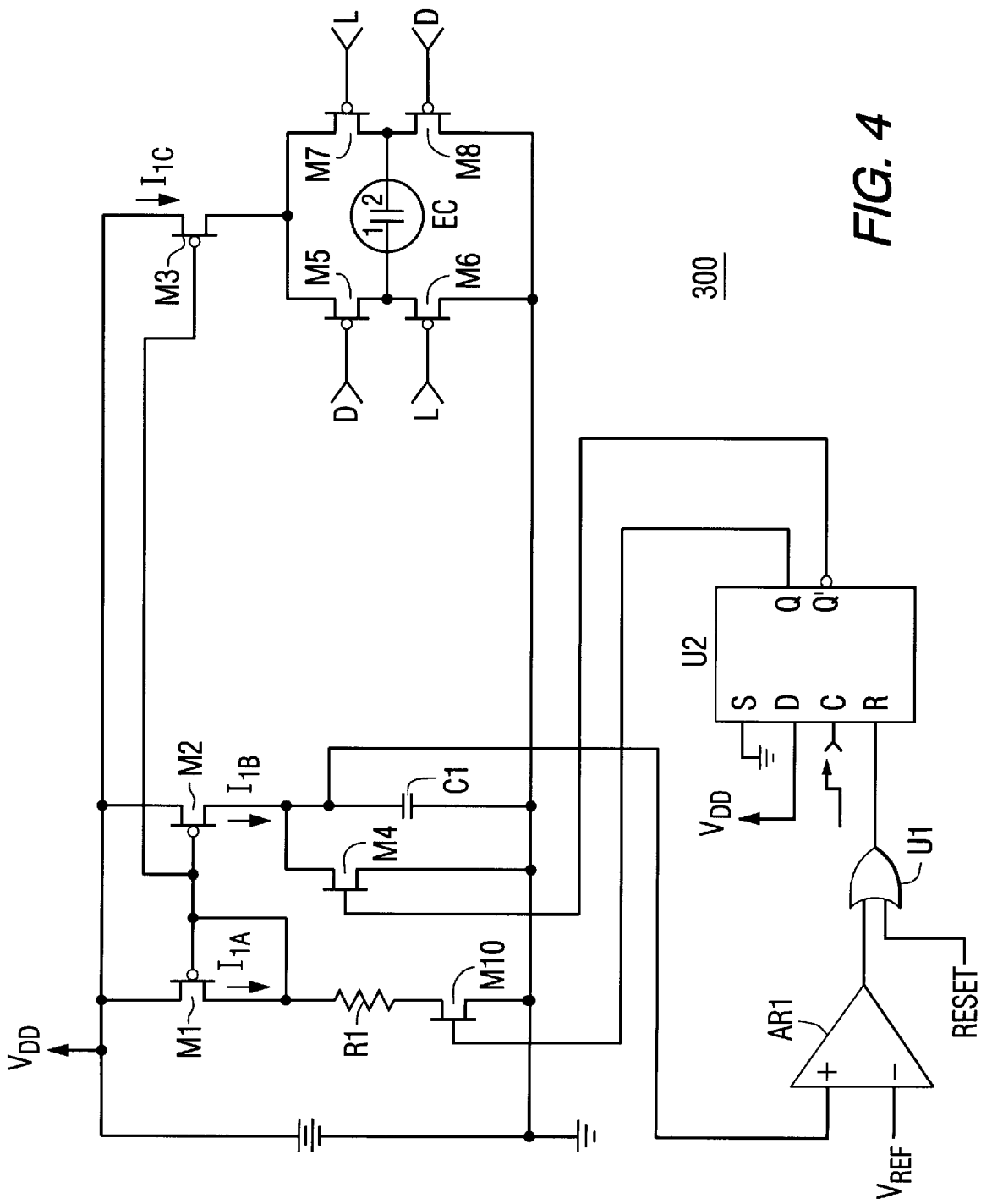
FIG. 4 depicts a schematic diagram of an electrochromic control apparatus according to the invention.

FIG. 4 depicts a schematic diagram of an electrochromic control apparatus 400 according to the invention. Since the electrochromic control apparatus 400 of FIG. 4 is similar to the electrochromic control apparatus 100 of FIG. 1, only difference between the two figures will be discussed.

Specifically, the electrochromic control apparatus 400 of FIG. 4 does not include the ninth transistor M9, as found in the third current loop of the apparatus 100 of FIG. 1. However, the electrochromic control apparatus 400 of FIG. 4 includes a "tenth" transistor M10, which has an output terminal connected to the negative terminal of the battery B, and an input terminal connected to the side of resistor R1 previously coupled to the negative terminal of the battery B. That is, resistor R1 and the negative terminal of the battery B are no longer connected directly, they are now connected via the tenth transistor M10. The tenth transistor M10 has a control terminal coupled to the non-inverting data output Q of the D-type flip-flop U2.

In operation, the tenth transistor M10 is normally in an off (i.e., non-conducting) state during the time that the electrochromic device is not to be charged. This can be seen by inspection of the timing diagram of FIG. 2. Specifically, the waveshape of the non-inverting data output Q of the D-type flip-flop U2 is exactly the opposite of the waveshape depicted in row 2 of the timing diagram of FIG. 2. Thus, in response to a positive clock signal (202), the non-inverting data output Q of the D-type flip-flop U2 goes to a high logic level, turning on the tenth transistor M10 and enabling the current mirror operation of the three current loops such that the charge or discharge cycle may begin. Upon conclusion of the charge or discharge cycle (i.e., $V_{C1}$ exceeds $V_{REF}$), the non-inverting data output Q of the D-type flip-flop U2 goes to a low logic level, turning off the tenth transistor M10 and returning the circuit to an "idle state" in which very little current is utilized by the circuit.

The above-described invention advantageously provides relatively fixed amounts of charge to an EC device, independent of battery voltage. Moreover, the invention advantageously conserves battery life when operating in a "low current" mode, i.e., when not passing current to the EC device. In this manner, the invention provides a substantial improvement over prior art EC controller, thereby enabling the use of EC devices in many applications, such as eyeglass applications utilizing electrochromic lenses or lens coatings, where battery life is crucial.

The above-described invention is particularly well suited for battery powered electrochromic device applications, such for controlling the charge level of electrochromic coatings on lenses in, e.g., a pair of eyeglasses (i.e., sunglasses). The invention also finds applicability in areas such as automotive, architectural and aircraft glass and/or glazing, advertising displays and the like.

Although various embodiments which incorporate the teachings of the present invention have been shown and described in detail herein, those skilled in the art can readily devise many other varied embodiments that still incorporate these teachings.

What is claimed is:

1. Apparatus for controlling a charge state of an electrochromic device, comprising:
   a first current source, coupled to a capacitor, for selectively charging said capacitor in accordance with a first current produced therefrom;
   a second current source, coupled to an electrochromic device, for selectively charging said electrochromic device in accordance with a second current produced therefrom;
   a comparator, coupled to said capacitor, for comparing a voltage level of said capacitor to a reference voltage level and responsively producing an output signal indicative of said comparison;
   a first switch, coupled to said capacitor and said comparator, for decoupling said first current from said capacitor in response to said output signal indicating that said capacitor voltage level exceeds said reference voltage level;
   a second switch, coupled to said electrochromic device, for decoupling said second current from said electrochromic device in response to said output signal indicating that said capacitor voltage level exceeds said reference voltage level.

2. The apparatus of claim 1, further comprising:
   a current mirror, for simultaneously controlling said first current source and said second current source.

3. The apparatus of claim 2, further comprising:
   a third switch, coupled to said current mirror and said comparator, for reducing a control level of said current mirror in response to said comparator output signal indicating that said capacitor voltage level does not exceeds said reference voltage level.

4. The apparatus of claim 1, wherein said apparatus provides substantially fixed amount of charge to said electrochromic device.

5. Apparatus for controlling a charge state of an electrochromic devices, said electrochromic device receiving a charging current, said apparatus comprising:
   a reference impedance, coupled to receive a reference current proportional to said charging current, said reference impedance having a known impedance relationship with said electrochromic device;
   a comparator, coupled to said reference impedance, for comparing a voltage level of said reference impedance to a threshold voltage level and producing an output signal indicative of said comparison; and
   control logic, coupled to said comparator, for simultaneously adapting said reference current and said charging current in response to said output signal of said comparator.

6. The apparatus of claim 5, further comprising:
   a first switch for bypassing said reference impedance; and
   a second switch for bypassing said electrochromic device;
   said control logic simultaneously adapting said reference current and said charging current by simultaneously controlling said first and second switches.

7. The apparatus of claim 5, wherein:
   said control logic simultaneously increases said reference current and said charging current in response to said comparator output signal indicative of said voltage level of said reference impedance being below said a threshold voltage level.

8. The apparatus of claim 6, wherein:
   said control logic simultaneously increases said reference current and said charging current in response to said comparator output signal indicative of said voltage level of said reference impedance being below said a threshold voltage level.

9. The apparatus of claim 6, further comprising:
   a current mirror, for providing said reference current and said charging current, said reference current and said charging current being substantially fixed; wherein
   said control logic adapts said reference current and said charging current by selectively disabling said current mirror.

10. The apparatus of claim 6, further comprising:
    a polarity reversal switch, coupled to said electrochromic device and said control logic, for selectively reversing a polarity of said reference current applied to said electrochromic device; wherein
    said charge level of said electrochromic device is increase by a positive polarity charging current and decreased by a negative polarity charging current.

11. The apparatus of claim 10, further comprising:
    a first switch for bypassing said reference impedance; and
    a second switch for bypassing said electrochromic device;
    said control logic simultaneously adapting said reference current and said charging current by simultaneously controlling said first and second switches; and
    said charging current polarity being adapted in response to a polarity indicative control signal.

12. In a pair of sunglasses having a lens portion optically cooperating with an electrochromic material, apparatus for controlling a charge state of said electrochromic material, said electrochromic material receiving a charging current, said apparatus comprising:
    a reference impedance, coupled to receive a reference current proportional to said charging current, said reference impedance having a known impedance relationship with said electrochromic material;
    a comparator, coupled to said reference impedance, for comparing a voltage level of said reference impedance to a threshold voltage level and producing an output signal indicative of said comparison; and
    control logic, coupled to said comparator, for simultaneously adapting said reference current and said charging current in response to said output signal of said comparator.

13. The apparatus of claim 12, further comprising:

a first switch for bypassing said reference impedance; and a second switch for bypassing said electrochromic material;

said control logic simultaneously adapting said reference current and said charging current by simultaneously controlling said first and second switches.

14. The apparatus of claim 12, wherein:

said control logic simultaneously increases said reference current and said charging current in response to said comparator output signal indicative of said voltage level of said reference impedance being below said threshold voltage level.

15. The apparatus of claim 13, wherein:

said control logic simultaneously increases said reference current and said charging current in response to said comparator output signal indicative of said voltage level of said reference impedance being below said threshold voltage level.

16. The apparatus of claim 13, further comprising:

a current mirror, for providing said reference current and said charging current, said reference current and said charging current being substantially fixed; wherein said control logic adapts said reference current and said charging current by selectively disabling said current mirror.

17. The apparatus of claim 13, further comprising:

a polarity reversal switch, coupled to said electrochromic material and said control logic, for selectively reversing a polarity of said reference current applied to said electrochromic material; wherein said charge level of said electrochromic material is increase by a positive polarity charging current and decreased by a negative polarity charging current.

18. The apparatus of claim 17, further comprising:

a first switch for bypassing said reference impedance; and a second switch for bypassing said electrochromic material;

said control logic simultaneously adapting said reference current and said charging current by simultaneously controlling said first and second switches; and said charging current polarity being adapted in response to a polarity indicative control signal.

* * * * *